US011915532B2

(12) United States Patent
Kunz et al.

(10) Patent No.: US 11,915,532 B2
(45) Date of Patent: Feb. 27, 2024

(54) METHOD AND DEVICE FOR THE COMMUNICATION OF PARTICIPANTS IN A TRAFFIC INFRASTRUCTURE

(71) Applicant: Robert Bosch GmbH, Stuttgart (DE)

(72) Inventors: Daniel Kunz, Erdmannhausen (DE); Fredrik Kamphuis, Kalkar (DE); Nik Scharmann, Bietigheim-Bissingen (DE); Uwe Wilbrand, Leutenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 142 days.

(21) Appl. No.: 17/452,356

(22) Filed: Oct. 26, 2021

(65) Prior Publication Data

US 2022/0139124 A1 May 5, 2022

(30) Foreign Application Priority Data

Nov. 4, 2020 (DE) ..................... 10 2020 213 887.7

(51) Int. Cl.
*G07C 5/00* (2006.01)

(52) U.S. Cl.
CPC .................................... *G07C 5/008* (2013.01)

(58) Field of Classification Search
CPC ...................................................... G07C 5/008
USPC .......................................................... 701/117
See application file for complete search history.

(56) References Cited

U.S. PATENT DOCUMENTS

| | | | | |
|---|---|---|---|---|
| 7,283,904 B2 * | 10/2007 | Benjamin | ............. | H04L 69/329 340/425.5 |
| 11,097,735 B1 * | 8/2021 | Marasigan | ....... | G08G 1/096716 |
| 2016/0148439 A1 * | 5/2016 | Akselrod | ............... | G06Q 50/30 701/23 |
| 2016/0189544 A1 * | 6/2016 | Ricci | ................ | G08G 1/096827 701/117 |
| 2018/0052860 A1 * | 2/2018 | Hayes | ................... | H04W 4/029 |
| 2018/0220309 A1 * | 8/2018 | Gomes | ................. | G05D 1/0022 |

(Continued)

OTHER PUBLICATIONS

Dziembowski et al., "General State Channel Networks," ACM SIGSAC Conference On Computer and Communications Security (CCS '18), Association for Computing Machinery, 2018, pp. 949-966. <HTTPS://DOI.ORG/10.1145/3243734.3243856> Downloaded Oct. 25, 2021.

(Continued)

*Primary Examiner* — Logan M Kraft
*Assistant Examiner* — John D Bailey
(74) *Attorney, Agent, or Firm* — NORTON ROSE FULBRIGHT US LLP; Gerard A. Messina

(57) ABSTRACT

Devices and methods, in particular computer-implemented methods, for the communication of participants in a traffic infrastructure. A state channel, associated with a distributed ledger technology system, to a second participant is set up at a first participant, and a channel, associated with the state channel, to a third participant is set up at the first participant. A first instruction is sent to the third participant via the channel, such that if a second instruction of the third participant is received via the channel, and if the second instruction fulfills a condition that is a function of the first instruction, the first participant and/or the third participant are controlled as a function of the first instruction or as a function of the second instruction.

17 Claims, 3 Drawing Sheets

(56) References Cited

U.S. PATENT DOCUMENTS

| | | | | |
|---|---|---|---|---|
| 2019/0007484 | A1* | 1/2019 | Chen | H04W 4/46 |
| 2019/0287080 | A1* | 9/2019 | Penilla | G06F 9/00 |
| 2019/0370760 | A1* | 12/2019 | Kundu | H04L 9/3239 |
| 2019/0377336 | A1* | 12/2019 | Avery | G05D 1/021 |
| 2020/0026289 | A1* | 1/2020 | Alvarez | G05D 1/0088 |
| 2020/0062203 | A1* | 2/2020 | Westover | B60R 21/0136 |
| 2020/0108840 | A1* | 4/2020 | Andres | B60W 40/09 |
| 2021/0027557 | A1* | 1/2021 | Margaria, Jr. | B60W 50/04 |
| 2021/0114626 | A1* | 4/2021 | Hirose | B60R 21/00 |
| 2021/0250173 | A1* | 8/2021 | Obiagwu | H04W 4/06 |
| 2021/0253112 | A1* | 8/2021 | McFarland, Jr. | B60W 40/105 |
| 2021/0261117 | A1* | 8/2021 | McFarland, Jr. | G08G 1/096791 |
| 2021/0291819 | A1* | 9/2021 | Smith | B60W 30/0956 |
| 2021/0294342 | A1* | 9/2021 | Marasigan | G08G 1/096791 |
| 2021/0295459 | A1* | 9/2021 | Smith | G06Q 50/265 |
| 2021/0295612 | A1* | 9/2021 | Marasigan | G06F 16/43 |
| 2021/0319696 | A1* | 10/2021 | Ahire | G08G 1/085 |
| 2021/0366289 | A1* | 11/2021 | Salles | G08G 1/22 |
| 2021/0380113 | A1* | 12/2021 | Marasigan | G08G 1/22 |
| 2022/0108291 | A1* | 4/2022 | Cain, Jr. | G08G 1/0112 |
| 2022/0138700 | A1* | 5/2022 | Oehler | G07C 5/008<br>705/305 |
| 2022/0222762 | A1* | 7/2022 | Lu | G07C 5/008 |

OTHER PUBLICATIONS

Dziembowski et al., "Perun: Virtual Payment Hubs Over Cryptocurrencies," IEEE Symposium on Security and Privacy (SP), 2019, pp. 1-19. <https://eprint.iacr.org/2017/635.pdf> Downloaded Oct. 25, 2021.

Nakamoto, "Bitcoin: A Peer-To-Peer Electronic Cash System," Bitcoin Org., 2002, pp. 1-9. <https://bitcoin.org/bitcoin.pdf> Downloaded Oct. 25, 2021.

McCorry et al., "PISA: Arbitration Outsourcing for State Channels," Proceedings of the 1st ACM Conference on Advances in Financial Technologies (AFT '19), 2019, pp. 1-15. <https://smeiklej.com/files/aft19b.pdf> Downloaded Oct. 25, 2021.

* cited by examiner

METHOD AND DEVICE FOR THE COMMUNICATION OF PARTICIPANTS IN A TRAFFIC INFRASTRUCTURE

CROSS REFERENCE

The present application claims the benefit under 35 U.S.C. § 119 of German Patent Application No. DE 102020213887.7 filed on Nov. 4, 2020, which is expressly incorporated herein by reference in its entirety.

BACKGROUND INFORMATION

The present invention relates to an in particular computer-implemented method and to a device for the communication of participants in a traffic infrastructure.

SUMMARY

The methods and the devices for the communication of participants in a traffic infrastructure in accordance with example embodiments of the present invention represent a significant improvement with regard to performance and scaling.

In accordance with an example embodiment of the present invention, a first method runs at a first of the participants from the traffic infrastructure. The first method is used for communication with a second participant and with a third participant. The second participant is an intermediary. Using the first method, at the first participant for example a behavior of the first participant in traffic is agreed upon with the third participant. At the third participant, a further method can run that has steps that are complementary to those of the first method, or that has the same steps.

In accordance with an example embodiment of the present invention, for the communication of participants in a traffic infrastructure, the first method provides that at a first participant a state channel, in particular associated with a distributed ledger technology system, is set up to a second participant, and that at the first participant a channel, associated with the state channel, to a third participant is set up, and that a first instruction is sent via the channel to the third participant, and if, via the channel, a second instruction of the third participant is received, and if the second instruction fulfills a condition that is a function of the first instruction, the first participant and/or the third participant are controlled as a function of the first instruction or as a function of the second instruction.

Preferably, it is provided that a first certificate and a first digital signature for the first certificate are determined, the first certificate defining a first identification for a channel, a first characteristic, and a first statement relating to a validity of the channel, a first message being sent from the first participant to the second participant, the first message including the first certificate and the first digital signature, a second message being received, the second message including a second certificate and a second digital signature, the second certificate defining a second identification, a second characteristic, and a second statement concerning a validity, and a third message being received, the third message including a third certificate and a third digital signature, the third certificate defining a third identification, a third characteristic, and a third statement concerning a validity, such that, if the second digital signature is a digital signature of the second participant for the second certificate, and if the third digital signature is a digital signature of the second participant for the third certificate, and if the second identification and the third identification fulfill a first condition that is a function of the first identification, and if the second characteristic and the third characteristic fulfill a second condition that is a function of the first characteristic, and if the second statement concerning validity and the third statement concerning validity fulfill a third condition that is a function of the first statement concerning the validity of the channel, a first instruction and a fourth digital signature for the first instruction are determined and a fourth message is sent to the third participant, the fourth message including the first instruction and the fourth digital signature, a fifth message being received, the fifth message including a second instruction and a fifth digital signature, such that, if the fifth digital signature is a digital signature of the third participant for the second instruction, and if the second instruction fulfills a condition that is a function of the first instruction, the first participant is controlled as a function of the first instruction or as a function of the second instruction.

In accordance with an example embodiment of the present invention, preferably, the second message is sent to the third participant, or the second certificate and the second digital signature are sent to the third participant. In this way, the information is communicated to the third participant that the third participant requires in order to rule out that the first participant receives a different certificate or a different signature from the second participant than does the third participant itself.

In an aspect, the first instruction includes an item of information about an actual state or a target state of the traffic infrastructure or of one of the participants. The second instruction fulfills the condition for example if it contains the same information that the first instruction also contains. In this case, the fifth message provides the first participant with a proof that the third participant confirms the information. The proof is successful because the content of the second instruction in the fifth message is confirmed, in a manner secure against falsification, by the third participant with its own signature.

In an aspect of the present invention, the first instruction includes a request to the third participant or a command to the third participant. The second instruction fulfills the condition for example if it contains the same request or command to the third participant that the first instruction also contained. In this case, the fifth message provides proof to the first participant that the third participant confirms the request or command. The proof is successful because the content of the second instruction in the fifth message is confirmed in a manner secure against falsification by the third participant with its own signature.

In accordance with an example embodiment of the present invention, preferably, a time segment is determined, a behavior for the first participant in the time segment is determined, a target behavior for the third participant in the time segment is determined, the first instruction is determined as a function of the time segment and the target behavior, and the first participant is controlled in the time segment in accordance with the behavior for the first participant.

Preferably, for the behavior for the first participant in the time segment, a permit for travel through a region of the traffic infrastructure is signaled to the third participant. Preferably, for the behavior of the third participant in the time segment, it is specified to move through the region of the traffic infrastructure.

Preferably, if a deviation is determined between the behavior of the third participant in the time segment and the target behavior for the third participant, a notification is determined and/or the notification is sent from the first participant to the second participant via at least one state channel that is in particular associated with a distributed ledger technology system, and otherwise the notification is not determined and/or not sent, the notification including information about the deviation, in particular, the target behavior and/or the behavior of the third participant, the notification including the fifth message and the notification including costs for the deviation. With the fifth message, a faulty behavior of the third participant can be proven and a penalty therefor can be imposed that is a function of the costs.

In accordance with an example embodiment of the present invention, a second method runs at the second of the participants. With the second method, the second participant acts as an intermediary between the first participant and the third participant, so that the behavior of the first participant in traffic is agreed upon with the third participant for these participants in a clear, traceable, and fixed manner.

For the communication of a first participant, a second participant, and a third participant in the traffic infrastructure, the second method provides that a first message of a first participant is received by a second participant, the first message including a first certificate and a first digital signature of the first participant for the first certificate, the first certificate defining a first identification for a channel, a first characteristic, and a first statement concerning a validity of the channel, a second message being received, the second message including a second certificate and a second digital signature of the third participant for the second certificate, the second certificate defining a second identification, a second characteristic, and a second statement concerning a validity, such that, if the second identification fulfills a first condition that is a function of the first identification for the channel, and if the second characteristic fulfills a second condition that is a function of the first characteristic, and if the second statement concerning validity fulfills a third condition that is a function of the first indication concerning the validity of the channel, a third certificate and a third digital signature of the second participant are determined, the second certificate defining the first identification for the channel, the first characteristic, and the first statement concerning the validity of the channel, a third message being sent to the first participant and/or to the third participant, the third message including the third certificate and the third digital signature. In this way, it is confirmed to the two participants that they have agreed on the same characteristic for the same channel with the same validity.

In accordance with an example embodiment of the present invention, preferably, a notification is received via at least one state channel associated in particular with a distributed ledger technology system, between the first participant and the second participant for carrying out translations, the notification including an item of information about a deviation between a target behavior and a behavior of the third participant, the notification including a fourth message and the notification including costs for the deviation, it being checked whether the deviation between the behavior of the third participant in a time segment and the target behavior for the third participant fulfills a criterion, and the first characteristic and/or the second characteristic being modified as a function of the costs if the deviation fulfills the criterion, and otherwise the characteristic not being modified as a function of the costs. With the fourth message, a faulty behavior of the third participant can be proven and a penalty therefor can then be imposed that is a function of the costs.

In accordance with an example embodiment of the present invention, the third participant uses the further method. This method is in particular a computer-implemented method for communication with the first participant and with the second participant in the traffic infrastructure, it being provided that at the third participant a state channel, in particular associated with a distributed ledger technology system, to the second participant is set up, and that at the third participant a channel, associated with the state channel, to the first participant is set up, and that the third participant receives a first instruction via the channel from the first participant, a second instruction being determined by the third participant, the second instruction being sent to the first participant, and the first participant being controlled as a function of the first instruction or as a function of the second instruction.

In accordance with an example embodiment of the present invention, a device for the communication of participants in the traffic infrastructure is designed to carry out at least one of the methods.

In accordance with an example embodiment of the present invention, a computer-readable storage medium and a computer program are also provided. These include computer-readable instructions that, when executed by a computer, cause this computer to carry out at least one of the methods.

In accordance with an example embodiment of the present invention, a data carrier signal is also provided with which the computer program is communicated.

Further features, possible applications, and advantages of the present invention result from the following description of exemplary embodiments of the present invention that are shown in the Figures. Here, all described or presented features form the subject matter of the present invention, by themselves or in any combination, independent of their formulation or representation in the description or in the figures.

DETAILED DESCRIPTION OF EXAMPLE EMBODIMENTS

Figure 1:
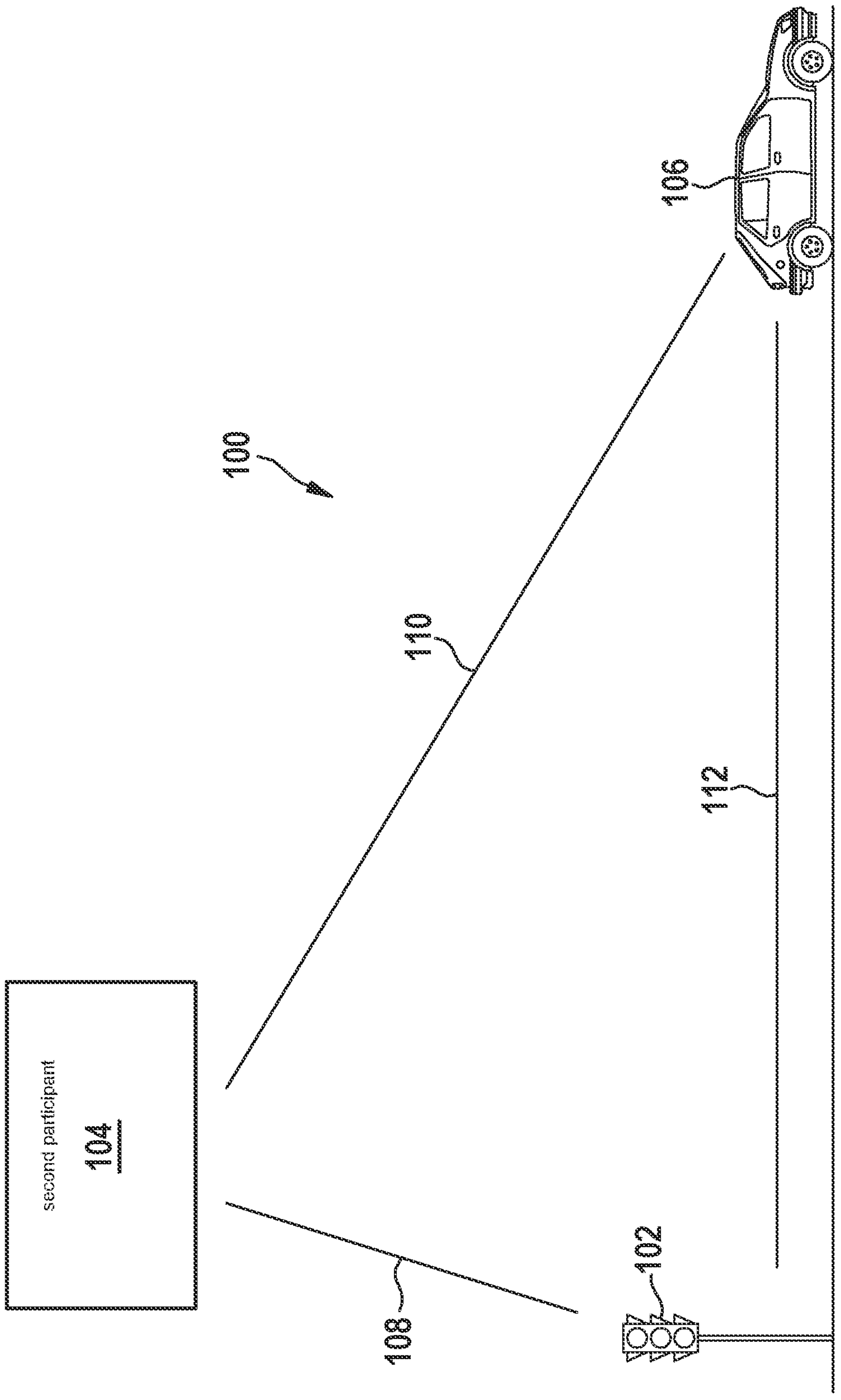
FIG. 1 schematically shows a traffic infrastructure, in accordance with an example embodiment of the present invention.

FIG. 1 schematically shows a traffic infrastructure 100.

In the example, traffic infrastructure 100 includes a first participant 102, a second participant 104, and a third participant 106.

In the example, first participant 102 is a traffic light. In the example, second participant 104 is an intermediary. In the example, third participant 106 is a vehicle.

In the example, first participant 102 and second participant 104 can be connected at least at times via a first state channel 108. In the example, first state channel 108 is associated with a distributed ledger technology system.

In the example, third participant 106 and second participant 104 can be connected at least at times via a second state channel 110. In the example, second state channel 110 is associated with the distributed ledger technology system.

In the example, first participant 102 and third participant 106 can be connected, at least at times, via a channel 112.

The documents (Reference 1) and (Reference 2) listed below describe aspects of distributed ledger technology systems and of state channels of this type, and are hereby expressly incorporated into the present description.

Stefan Dziembowski, Sebastian Faust, and Kristina Hostáková, 2018. "General State Channel Networks." In: *Proceedings of the* 2018 *ACM SIGSAC Conference on Computer and Communications Security* (*CCS* '18). Association for Computing Machinery, New York, NY, USA, 949-966. DOI:https://doi.org/10.1145/3243734.3243856 (Reference 1).

S. Dziembowski, L. Eckey, S. Faust and D. Malinowski, "Perun: Virtual Payment Hubs over Cryptocurrencies," 2019 *IEEE Symposium on Security and Privacy* (*SP*), San Francisco, CA, USA, 2019, pp. 106-123, doi: 10.1109/SP.2019.00020 (Reference 2).

In specific embodiments, the distributed ledger technology system can include a blockchain that is realized in the form of a distributed or decentralized database, a plurality of network elements of a blockchain network each storing data blocks of the blockchain. Fundamental aspects of blockchain technology are described for example in the following documents:

Nakamoto, Satoshi. (2009). "Bitcoin: A Peer-to-Peer Electronic Cash System," https://bitcoin.org/bitcoin.pdf.

Patrick McCorry, Surya Bakshi, Iddo Bentov, Sarah Meiklejohn, and Andrew Miller, 2019. "Pisa: Arbitration Outsourcing for State Channels." In: *Proceedings of the* 1*st ACM Conference on Advances in Financial Technologies* (*AFT* '19). Association for Computing Machinery, New York, NY, USA, 16-30, DOI:https://doi.org/10.1145/3318041.3355461.

In the example, channel 112 is a virtual channel as described in III. A. 2) of (Reference 2), realized as a virtual channel.

In the example, first state channel 108 and second state channel 110 are realized as described in III. A. 1 of (Reference 2), as ledger channels.

In the example described in the following, first participant 102 provides a resource that third participant 106 can request and/or use. In the example, the resource is provided to third participant 106 under conditions, or through commands for behavior. The request and the allocation of a resource of first participant 102 to third participant 106, and a behavior of first participant 102 and of second participant 106, can be agreed upon based on a smart contract via channel 112.

The allocation of the resource can take place based on a smart contract. The smart contract makes it possible for mutually mistrustful, individually rational parties to conclude and/or implement a contract in a reliable and fair manner with the aid of the distributed ledger technology system. Here, the smart contract defines a contractual content as program code, while the distributed ledger technology system provides a decentralized platform that reliably executes this program code correctly and verifiably.

With the aid of state channels, it is possible to carry out the smart contract without communication with the ledger of the distributed ledger technology system, and nonetheless to retain the guaranteed properties. As soon as a state channel is created directly between two participants, smart contracts can be concluded and executed between the creating participants efficiently, in the best case in real time. A networking of a plurality of state channels to form a state channel network makes it possible to execute these smart contracts over a plurality of state channels. The participants concluding the agreement need not necessarily open a separate state channel between one another.

In the example, first participant 102 and third participant 106 are connected via a state channel network that includes first state channel 108 and second state channel 110. First participant 102 and third participant 106 are not connected directly by a state channel. In this context, "direct" means that there is a state channel that connects two participants to one another without the existence of another, intermediately connected participant.

Figure 2:
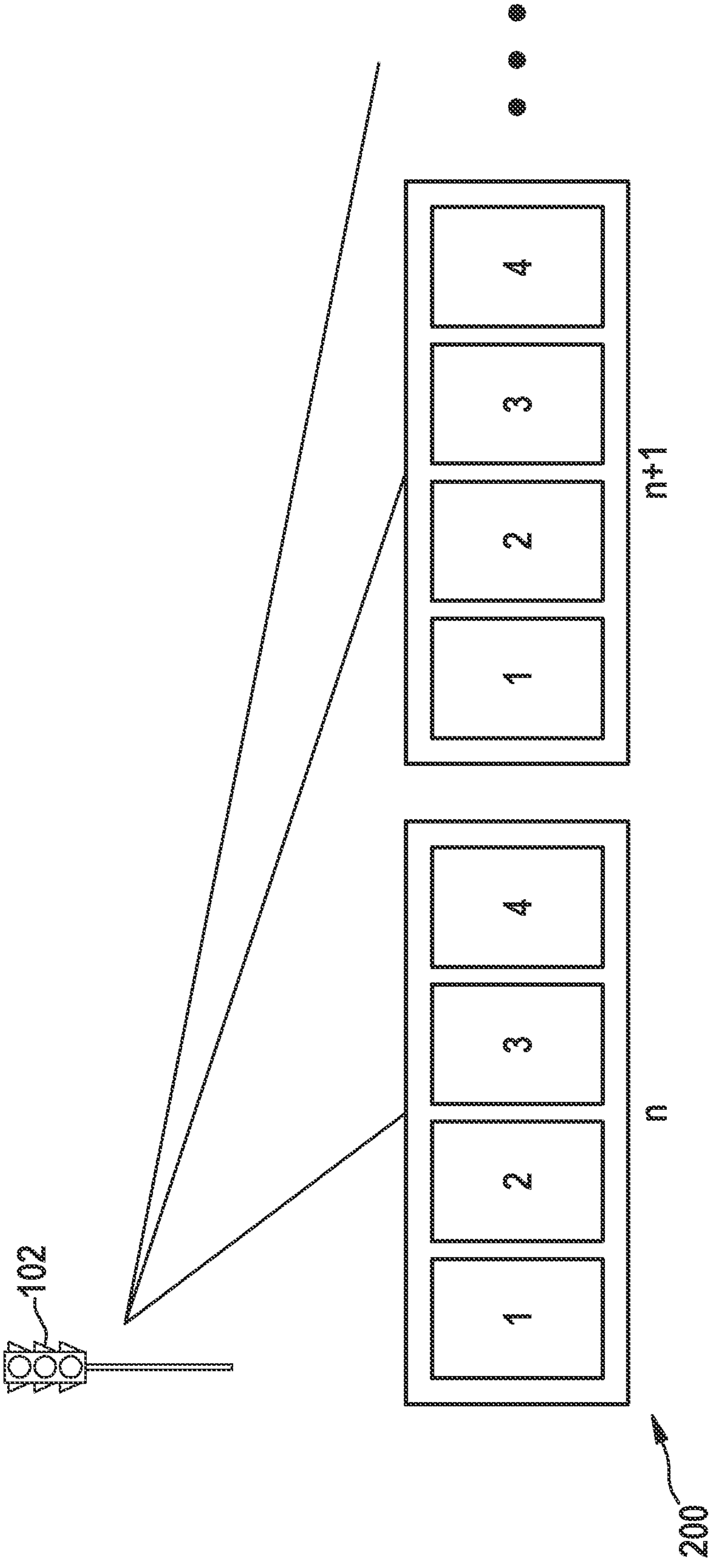
FIG. 2 schematically shows slots for traffic light phases, in accordance with an example embodiment of the present invention.

For the example in which first participant 102 is the traffic light and third participant 106 is the vehicle, FIG. 2 schematically shows slots 200 for a first traffic light phase n and for a second traffic light phase n+1 for the traffic light. The length of a traffic light phase is defined in the example by a time duration in which the traffic light is green.

In this example, slots 200 are the resource, and, in the example, define in each traffic light phase four segments 1, 2, 3, 4 in each of which a vehicle can pass through traffic light 102 when it is green. In the example, the four segments 1, 2, 3, 4 correspond to target values for time segments within which the vehicle is to pass through the traffic light.

The target values for the time segments are assigned by the traffic light in such a way that both the vehicle and other vehicles to which other time segments of the same traffic light phase are assigned can also pass through the traffic light when it is green. In the example shown in FIG. 2, time segments can be assigned in the first traffic light phase n or in the second traffic light phase n+1.

The traffic light phases can have a defined duration and can be started by a defined signal time plan. A length and/or frequency of traffic light phases can be controlled independently of traffic or dependent on traffic. A traffic-dependent controlling can be provided in order to control the traffic light as a function of information about the volume of traffic. The volume of traffic can be acquired for example by traffic detectors such as induction loops, motion detectors, or video cameras.

The request and the allocation of the resource of first participant 102 to third participant 106, and a behavior of first participant 102 and of third participant 106, can take place based on a smart contract via virtual channel 112, as described below.

Figure 3:
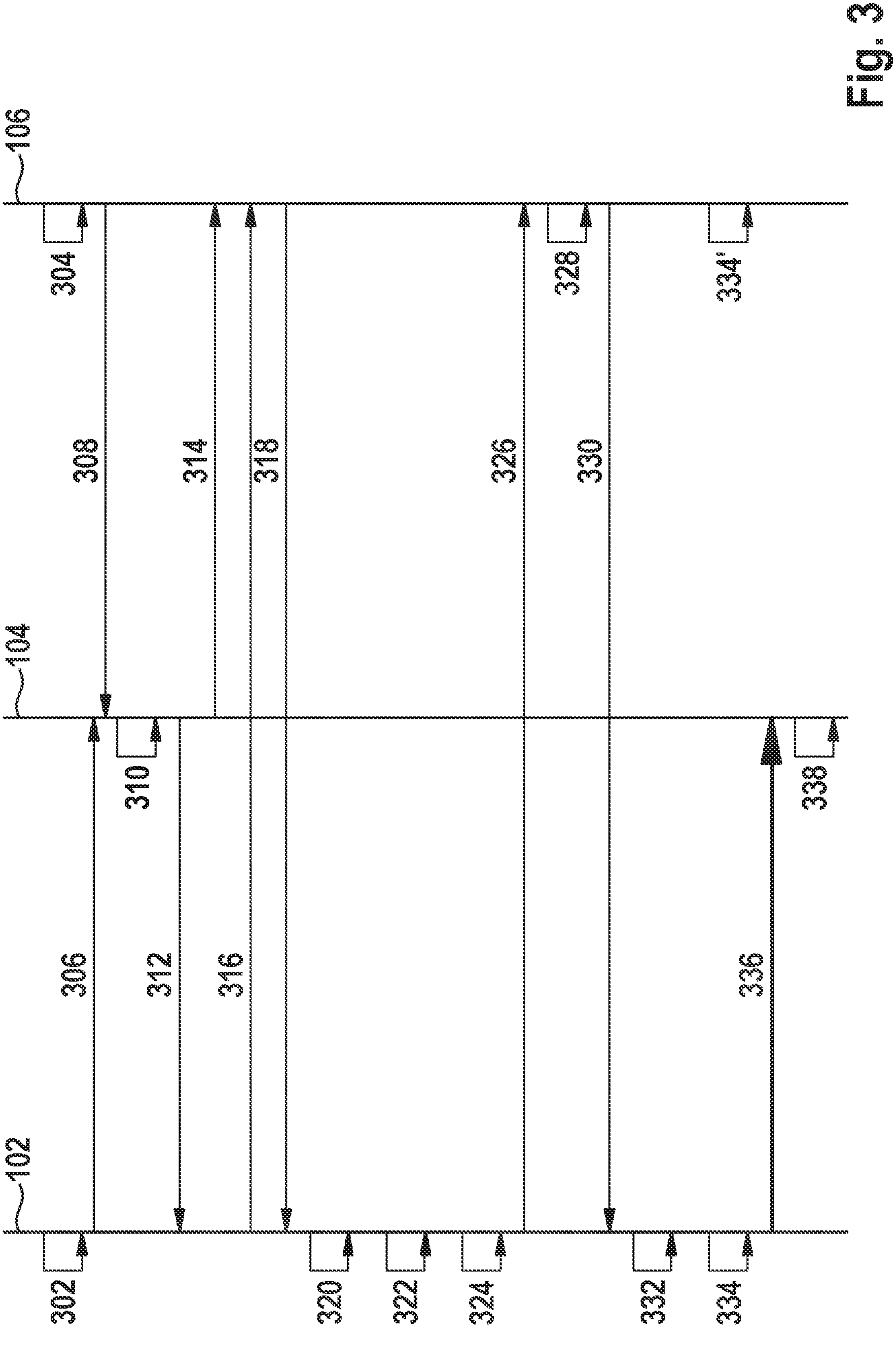
FIG. 3 shows steps in a method for communication between participants, in accordance with an example embodiment of the present invention.

First participant 102 and third participant 106 can create channel 112 with one another in real time using the procedure described in the following with reference to FIG. 3, without communicating with the ledger of the distributed ledger technology system on which first state channel 108 and second state channel 110 are based. A first method runs on first participant 102. A second method runs on second participant 104. A third method runs on third participant 106. In the example, the third method is implemented in the same manner as the first method.

The methods and their interaction are described in the following. In the following, first participant 102 is designated Alice. In the following, second participant 104 is designated Ingrid. In the following, the third participant is designated Bob. In the following, channel 112 is designated γ.

In a step 302, a first certificate, ocAlice, and a first digital signature, σAlice, for the first certificate ocAlice are determined. In the example, the first certificate ocAlice is signed with the first digital signature σAlice.

The first certificate ocAlice defines a first identification for the channel γ, a first characteristic and a first statement concerning a validity v of the channel γ. In the example, the first characteristic is an initial balance for the channel γ, in the form [Alice→xA, Bob→xB].

In a step 304, a second certificate, ocBob, and a second digital signature, σBob, for the second certificate ocBob are determined. The second certificate ocBob is signed in the example with the second digital signature σBob.

The second certificate ocBob defines a second identification for the channel γ, a second characteristic, and a second statement concerning a validity v of the channel γ. In the example, the second characteristic is an initial balance for the channel γ, in the form [Alice→xA, Bob→xB].

A message 306, OCAlice, is sent by first participant 102, Alice, to second participant 104, Ingrid. Message 306, OCAlice, includes the first certificate ocAlice and the first digital signature σAlice.

A message 308, OCBob, is sent by third participant 106, Bob, to second participant 104, Ingrid. Message 308 OCBob includes the second certificate ocBOB and the second digital signature σBob.

In a step 310, it is checked whether the second identification fulfills a first condition that is a function of the first identification for the channel γ. In the example, the first condition is that the first identification for the channel γ and the second identification for the channel γ designate the same channel.

In step 310 it is checked whether the second characteristic fulfills a second condition that is a function of the first characteristic. In the example, the second condition is that the first characteristic agrees with the second characteristic. In particular, the second condition is met when both include the initial balance [Alice→xA, Bob→xB].

In step 310, it is checked whether the second statement concerning the validity v of the channel γ fulfills a third condition that is a function of the first statement concerning the validity v of the channel γ.

If these conditions are met, a third certificate ocIngrid and a third digital signature σIngrid of the second participant, Ingrid, are determined. The third certificate ocIngrid is signed in the example with the third digital signature σIngrid.

Otherwise, the method ends. In the example, the method also ends if one of the received certificates is not verifiable through the signature assigned to it.

In the example, the third certificate, ocIngrid, defines the first identification for the channel γ, the first characteristic, in particular the initial balance [Alice→xA, Bob→xB], and the first statement on the validity v of the channel γ. The third certificate can also define the second identification for the channel γ, the second characteristic, in particular the initial balance [Alice→xA, Bob→xB], and the second statement on the validity v of the channel γ. In the example, these are identical as long as the conditions are fulfilled.

A message 312, OCIngrid, is sent to first participant 102, Alice. A message 314, OCIngrid, is sent to third participant 106, Bob.

In response to the receipt of message 312, OCIngrid, at first participant 102, Alice, a message 316, OCIngrid, is determined and/or sent from first participant 102, Alice, to third participant 106, Bob. In the example, message 316, OCIngrid, is a copy of message 312, OCIngrid.

In response to the receipt of message 314, OCIngrid, at third participant 106, Bob, a message 318, OCIngrid, is determined and/or sent from third participant 106, Bob, to first participant 102, Alice. In the example, message 318, OCIngrid, is a copy of message 314, OCIngrid.

In a step 320, it is checked whether a certificate received in message 312 is the second certificate ocIngrid of second participant 104, Ingrid.

In step 320, it is checked whether the digital signature received in message 312 is a digital signature σIngrid of the second participant 104, Ingrid, for the certificate received in message 312.

In a step 320 it is checked whether a certificate received in message 318 is the second certificate ocIngrid of second participant 104, Ingrid.

In step 320 it is checked whether the digital signature received in message 318 is a digital signature σIngrid of second participant 104, Ingrid, for the certificate received in message 318.

In the example, the method ends when one of the received certificates is not the second certificate ocIngrid of second participant 104, Ingrid. In the example, the method ends when one of the received certificates is not verifiable through the signature assigned to it.

In a step 322, it is checked whether the identification received in message 312 and the identification received in message 318 fulfill a first condition that is a function of the first identification. In the example, this condition is met when the identifications agree.

In step 322, it is checked whether the characteristic received in message 312 and the characteristic received in message 318 fulfill a second condition that is a function of the first characteristic. In the example, this condition is fulfilled when the characteristics, in particular the initial balances, agree.

In step 322, it is checked whether the statement concerning validity v of channel γ, received in message 312, and the statement concerning validity v of channel γ received in message 318 fulfill a third condition that is a function of the first statement concerning validity v of channel γ. In the example, this condition is fulfilled when the validities agree.

If the conditions agree, then in a step 324 a first instruction mβ and a digital signature σA for the first instruction mβ are determined. In the example, the first instruction mβ is signed with digital signature σA. Otherwise, the method ends.

The first instruction mβ includes for example an item of information concerning an actual state or a target state of the traffic infrastructure or of one of the participants.

In an aspect, the first instruction mβ includes a request to the third participant 106, Bob, or a command to the third participant 106, Bob.

For the traffic light as first participant 102 Alice, for example a time segment, e.g. one of the slots 1, 2, 3, or 4, is determined in which the vehicle, as second participant 106 Bob, is to pass through the traffic light if it is green.

In this way, in the example a behavior of the traffic light, i.e. of first participant 102 Alice, in this time segment is defined. In this way, in the example a target behavior of the vehicle, i.e. of third participant 106 Bob, in the time segment is determined.

In this example, first instruction mβ is determined as a function of the time segment and of the target behavior.

A message 326, WA, is sent by first participant 102 Alice to third participant 106 Bob. In the example, message 326 WA is sent directly, i.e. without the intermediate connection of second participant 104 Ingrid, from first participant 102 Alice to third participant 106 Bob.

Message 326, WA, includes first instruction mβ and digital signature σA.

In a step 328, a second instruction is determined by third participant 106 Bob as a function of first instruction mβ. Preferably, first instruction mβ is verified as a function of digital signature σA, and the second instruction is determined only if the verification is successful.

The method ends for example if first instruction mβ with digital signature σA is not verifiable. In the example, the second instruction is signed with digital signature σB.

A message 330, WB, is sent by third participant 106 Bob to first participant 102 Alice. In the example, message 330 WB is sent directly, i.e. without the intermediate connection of second participant 104 Ingrid, from third participant 106 Bob to first participant 102 Alice.

Message 330 WB includes the second instruction and digital signature σB.

In a step 332, first participant 102 Alice checks whether the digital signature σB is a digital signature of third participant 106 Bob for the second instruction.

In a step 332, it is checked whether the second instruction fulfills a condition that is a function of the first instruction mβ. The condition is for example that the first instruction mβ and the second instruction agree.

In the aspect in which first instruction mβ includes the information about the actual state or the target state of the traffic infrastructure or one of the participants, the second instruction for example fulfills the condition if it contains the same information also contained by first instruction mβ.

In this case, message 330 WB provides proof to first participant 102 Alice that third participant 106 Bob confirms the information.

In the aspect in which first instruction mβ includes a request to third participant 106 Bob or a command to third participant 106 Bob, the second instruction fulfills the condition for example if it contains the same request or command to third participant 106 Bob that is also contained in first instruction mβ.

In this case, message 330 WB provides proof to first participant 102 Alice that third participant 106 Bob confirms the request or command.

If the condition is fulfilled, first participant 102 Alice, in a step 334, is controlled as a function of first instruction mβ or as a function of the second instruction. Otherwise, the method ends.

In the example, third participant 106 Bob, in a step 334' substantially temporally parallel thereto, is also controlled as a function of the first instruction mβ or as a function of the second instruction.

In the example of the traffic light, first participant 102 Alice is controlled in the time segment according to the behavior for first participant 102 Alice. This means, for the example of the traffic light, that in this time segment, i.e. in particular in the slot that is assigned to the vehicle, the traffic light is green. In the example, third participant 106 Bob behaves as agreed upon. For the example of the traffic light, this means that the vehicle passes through the traffic light in the slot assigned to the vehicle.

In an optional aspect, if in the time segment a deviation is determined between the behavior of third participant 106 Bob and the target behavior for third participant 106 Bob, a notification 336 is determined and/or notification 336 is sent from first participant 102 Alice to second participant 104 Ingrid via first state channel 108.

In the example, this would be the case if third participant 106 Bob did not behave as agreed upon. For the example of the traffic light, this means that the vehicle did not pass through the traffic light in the slot assigned to the vehicle.

If there is a deviation of first participant 102 Alice, it can be provided that third participant 106 Bob sends a corresponding notification 336 to second participant 104 Ingrid via second state channel 110.

Notification 336 can include information about the deviation, in particular the target behavior and/or the behavior of third participant 106 Bob.

The notification can include message 330 WB. Notification 336 can include costs for the deviation.

Through message 330 WB, a faulty behavior of third participant 106 Bob can be demonstrated and a penalty therefor can be imposed that is a function of the costs.

In an optional step 338, it is checked whether the deviation between the behavior of third participant 106 Bob in the time segment and the target behavior for third participant 106 Bob fulfills a criterion.

In the optional step 338, for example, if the deviation fulfills the criterion the first characteristic and/or the second characteristic are modified as a function of the costs.

Otherwise, the characteristics are not modified as a function of the costs.

For example, the initial balance [Alice→xA, Bob→xB] or an intermediate balance after a plurality of transactions is modified as a function of the costs.

For this purpose, a communication with the distributed ledger technology system can also be provided in the blockchain in order to compensate a balance between second participant 104 Ingrid and third participant 106 Bob.

Through the described method, losses of efficiency are prevented that occur even in traffic light circuits controlled by traffic detectors. The traffic detectors measure only the volume of traffic that is already accumulated, and thus result in interruptions in the flow of traffic. In contrast, standing times of vehicles can be minimized through the assignment of slots.

It can be provided to network a plurality of participants, in particular a plurality of traffic lights and/or vehicles. In this way, the traffic light phases of the individual networked traffic lights can be adapted to the actual volume of vehicles for a phase circuit in real time.

Preferably, a social optimum that is to be achieved is specified.

In an aspect, it is taken into account that traffic lights and other traffic participants, e.g. vehicles, are usually not all equally trustworthy. The other traffic participants may individually behave rationally, irrationally, or even maliciously, for example in order to obtain more advantageous green phases for themselves, or to interrupt a flow of traffic.

The green phases offered as slots by a traffic light can be offered economically. That is, the social optimum can be achieved on the basis of an incentive model in which slots are sold. This incentive model determines criteria that enable a traffic participant to take part in an appropriate individually rational manner.

Non-compliance is penalized for example using a points system. The procedure has been represented in a concrete realization with a traffic light and a vehicle.

The procedure is generally applicable to use in a traffic infrastructure.

For example, time and vehicle-specific slots for a usage of roadway segments can be assigned or auctioned.

For example, time and vehicle-specific slots for a passing procedure or a granting of right-of-way can be assigned or auctioned. The procedure for vehicles is also applicable to other traffic participants, e.g. pedestrians.

This means that first participant 102 can signal a permit for traveling through a region of the traffic infrastructure in the time segment in which the resource is made available. For the behavior of third participant 106 in the time segment, it can be specified that this participant is to move through the region of the traffic infrastructure.

The blockchain forms the basis for the described smart contracts. Through the described method, peer-2-peer connections are possible, so that these smart contracts can be negotiated directly in real time without the influence of the underlying ledger of the distributed ledger technology system. A possible dispute about the smart contract is thus automatically resolved via the smart contract.

A plurality of intermediaries can also be provided through the state channel network. For example, an intermediary for an infrastructure operator, e.g. a traffic light operator, is provided that communicates via state channels with a multiplicity of stationary traffic infrastructure components, e.g. traffic lights. For example, an intermediary for a mobile service is provided that communicates, via state channels, with a multiplicity of mobile traffic participants. In this case, it can be provided that these intermediaries communicate with one another via a further state channel.

What is claimed is:

1. A computer-implemented method for communication of participants in a traffic infrastructure, the method comprising:

setting up, at a first participant, a state channel associated with a distributed ledger technology system, to a second participant;

setting up, at the first participant, a channel to a third participant, wherein the channel to the third participant is associated with the state channel;

sending, by the first participant and via the channel to the third participant, a first instruction to the third participant; and receiving, by the first participant and via the channel to the third participant, a second instruction from the third participant;

wherein, when the received second instruction of the third participant fulfills a condition that is a function of the first instruction, the first participant and/or the third participant is controlled as a function of the first instruction or as a function of the second instruction.

2. The method as recited in claim 1, wherein the first instruction includes an item of information about an actual state or a target state of the traffic infrastructure or of one of the participants.

3. The method as recited in claim 1, wherein the first instruction includes a request to the third participant or a command to the third participant.

4. The method as recited in claim 1, wherein the sending of the first instruction is dependent on receipt of a message by the first participant from the second participant.

5. The method as recited in claim 1, wherein the sending of the first instruction is dependent on receipt of a message by the first participant from the third participant.

6. The method as recited in claim 1, wherein the sending of the first instruction is dependent on (a) receipt of a message by the first participant from the second participant and (b) receipt of a message by the first participant from the third participant.

7. A computer-implemented method for communication in a traffic infrastructure, the method comprising:

setting up, at a first participant, a state channel associated with a distributed ledger technology system, wherein the state channel is to a second participant;

setting up, at the first participant, a channel to a third participant, wherein the channel to the third participant is associated with the state channel;

determining a first certificate and a first digital signature for the first certificate, the first certificate defining a first identification for the channel, a first characteristic and a first statement concerning a validity of the channel;

sending a first message from the first participant to the second participant, the first message including the first certificate and the first digital signature;

receiving, by the first participant, a second message from the second participant, the second message including a second certificate and a second digital signature, the second certificate defining a second identification, a second characteristic, and a second statement concerning a validity;

receiving, by the first participant, a third message from the third participant, the third message including a third certificate and a third digital signature, the third certificate defining a third identification, a third characteristic, and a third statement concerning a validity;

determining a first instruction and a fourth digital signature;

sending, by the first participant, a fourth message to the third participant, wherein when the fourth message includes the first instruction and the fourth digital signature, and wherein the determination of the first instruction and the fourth digital signature and the sending of the fourth message are performed in response to a combination of the following:

(a) the second digital signature is a digital signature of the second participant for the second certificate;

(b) the third digital signature is a digital signature of the second participant for the third certificate;

(c) the second identification and the third identification fulfill a first condition that is a function of the first identification;

(d) the second characteristic and the third characteristic fulfill a second condition that is a function of the first characteristic;

(e) the second statement concerning validity and the third statement concerning validity fulfill a third condition that is a function of the first statement concerning the validity of the channel;

receiving, by the first participant and from the third participant, a fifth message that includes a second instruction and a fifth digital signature, such that, when (a) the fifth digital signature is a digital signature of the third participant for the second instruction and (b) the second instruction fulfills a condition that is a function of the first instruction, the first participant is controlled as a function of the first instruction or as a function of the second instruction.

8. The method as recited in claim 7, wherein a time segment is determined, a target behavior for the first participant in the time segment is determined, a target behavior for the third participant in the time segment is determined, the first instruction is determined as a function of the time segment and of the target behavior for the third participant, and the first participant is controlled in the time segment according to the target behavior determined for the first participant.

9. The method as recited in claim 8, wherein: (i) for the behavior for the first participant in the time segment, it is specified to signal to the third participant a permit for a passage through a region of the traffic infrastructure, and/or (ii) for the behavior of the third participant in the time segment, it is specified to move through the region of the traffic infrastructure.

10. The method as recited in claim 8, wherein, when a deviation is determined between a behavior of the third participant in the time segment and the target behavior for the third participant, a notification is determined and/or the notification is sent via at least the state channel from the first participant to the second participant for carrying out transactions, and otherwise is not determined and/or is not sent, the notification including information about the deviation of the target behavior and/or the behavior of the third participant, the notification including the fifth message and the notification including costs for the deviation.

11. The method as recited in claim 7, wherein the second message is sent to the third participant, or the second certificate and the second digital signature are sent to the third participant.

12. A computer-implemented method for communication of participants in a traffic infrastructure, the method comprising:

receiving, from a first participant and by a second participant, a first message that includes a first certificate and a first digital signature of the first participant for the first certificate, the first certificate defining a first identification for a channel, a first characteristic, and a first statement concerning a validity of the channel;

receiving, from a third participant and by the second participant, a second message that includes a second certificate and a second digital signature of the third participant for the second certificate, the second certificate defining a second identification, a second characteristic, and a second statement concerning a validity; and responsive to a combination of (a) the second identification fulfilling a first condition that is a function of the first identification for the channel, (b) the second characteristic fulfilling a second condition that is a function of the first characteristic, and (c) the second statement concerning validity fulfilling a third condition that is a function of the first statement concerning the validity of the channel;

determining a third certificate and a third digital signature of the second participant, the third certificate defining the first identification for the channel, the first characteristic, and the first statement concerning the validity of the channel; and sending, by the second participant, a third message to the first participant and/or to the third participant, the third message including the third certificate and the third digital signature.

13. The method as recited in claim 12, wherein:

a notification is received via at least one state channel associated with a distributed ledger technology system between the first participant and the second participant for carrying out transactions;

the notification includes an item of information about a deviation between a target behavior for the third participant and a behavior of the third participant in a time segment;

the notification includes a fourth message, and the notification includes costs for the deviation;

whether the deviation fulfills a criterion is checked; and the first characteristic and/or the second characteristic is modified as a function of the costs conditional upon that the deviation fulfills the criterion.

14. A computer-implemented method for communication with a first participant and a second participant in a traffic infrastructure, the method comprising:

setting up at a third participant a state channel, associated with a distributed ledger technology system, to the second participant;

setting up at the third participant a channel, associated with the state channel, to the first participant;

receiving, by the third participant, a first instruction via the channel from the first participant;

determining, by the third participant, a second instruction based on the first instruction;

sending, by the third participant, the second instruction to the first participant; and controlling the third participant as a function of an agreement between the first instruction and the second instruction.

15. The method as recited in claim 14, wherein:

the setting up of the state channel includes the third participant sending a first message to the second participant and the third participant receiving a second message from the second participant; and the setting up of the channel to the first participant includes the third participant sending to the first participant a third message that is based on the receipt, by the third participant, of the second message.

16. A device for communication of participants in a traffic infrastructure, the device configured to:

set up, at a first participant, a state channel associated with a distributed ledger technology system, to a second participant;

set up, at the first participant, a channel to a third participant, wherein the channel to the third participant is associated with the state channel;

send, by the first participant and via the channel to the third participant, a first instruction to the third participant; and receiving, by the first participant and via the channel to the third participant, a second instruction from the third participant;

wherein, when the received second instruction of the third participant fulfills a condition that is a function of the first instruction, the first participant and/or the third participant are controlled as a function of the first instruction or as a function of the second instruction.

17. A non-transitory computer-readable storage medium on which is stored a computer program for communication of participants in a traffic infrastructure, the computer program, when executed by a computer, causing the computer to perform the following steps:

setting up, at a first participant, a state channel associated with a distributed ledger technology system, to a second participant;

setting up, at the first participant, a channel to a third participant, wherein the channel to the third participant is associated with the state channel;

sending, by the first participant and via the channel to the third participant, a first instruction to the third participant; and receiving, by the first participant and via the channel to the third participant, a second instruction from the third participant;

wherein, when the received second instruction of the third participant fulfills a condition that is a function of the first instruction, the first participant and/or the third participant is controlled as a function of the first instruction or as a function of the second instruction.

* * * * *